UNITED STATES PATENT OFFICE.

FREDERIC H. L. C. SACC, OF NEUFCHATEL, SWITZERLAND.

IMPROVEMENT IN PROCESSES OF PRESERVING BUTTER.

Specification forming part of Letters Patent No. 171,532, dated December 28, 1875; application filed November 4, 1875.

*To all whom it may concern:*

Be it known that I, FREDERIC H. L. C. SACC, of Neufchatel, in the Swiss Republic, have invented a certain new and useful Process of Preserving Butter, of which the following is a specification:

In my process I avail myself of the antiseptic properties of alcohols, which prevent that change in the nitrogenous or azotic elements of butter which produces rancidity.

My process consists in malaxating or intimately mixing butter with, say, two per cent., more or less, in weight, of alcohol at 90° centesimal—that is to say, ninety per cent. pure alcohol. The butter thus prepared is put in suitable receptacles, such as earthen, glass, metal, or wooden vessels.

When it is desired to use the butter it is washed by kneading in fresh water, after which it will be found as fresh and pure as though newly made.

By the process above described the butter may be preserved for an indefinite length of time. I have thus kept butter for two years or more absolutely intact and pure.

I can make use of all alcohols, either pure or mixed with coloring or aromatic matters.

I do not claim, broadly, the use of alcohol as a preservative for butter; but

I claim—

The described process of preserving butter by mixing the same with two per cent. of alcohol at 90° C., as set forth.

In testimony whereof I have hereunto signed my name this 3d day of November, A. D. 1875.

FREDERIC SACC.

Witnesses:
 R. A. PIPER,
 W. H. L. LEE,
 H. GAULLIEW.